United States Patent [19]
Phillips

[11] 3,895,922
[45] July 22, 1975

[54] RING PAD STRESS COINED STRUCTURE

[75] Inventor: Austin Phillips, Santa Monica, Calif.

[73] Assignee: McDonnell Douglas Corporation, Santa Monica, Calif.

[22] Filed: Nov. 12, 1973

[21] Appl. No.: 415,174

Related U.S. Application Data

[62] Division of Ser. No. 277,359, Aug. 2, 1972, Pat. No. 3,796,086.

[52] U.S. Cl.................................. 29/183; 72/377
[51] Int. Cl............................................. B26f 1/00
[58] Field of Search........................ 29/183; 72/377

[56] References Cited
UNITED STATES PATENTS

| | | | |
|---|---|---|---|
| 3,110,086 | 11/1963 | Phillips............................ | 29/155 R |
| 3,434,327 | 3/1969 | Speakman........................... | 72/377 |

Primary Examiner—L. Dewayne Rutledge
Assistant Examiner—O. F. Crutchfield
Attorney, Agent, or Firm—G. W. Finch; W. J. Jason; D. L. Royer

[57] ABSTRACT

A metallic structural member having a discontinuity therein and improved fatigue strength is disclosed. A ring-shaped pad of material spaced about the aperture is cold-worked into a plastic state and then allowed to rebound into an elastic state thereby generating a region of residual compressive stress about the aperture which results in a member having improved fatigue strength.

3 Claims, 5 Drawing Figures

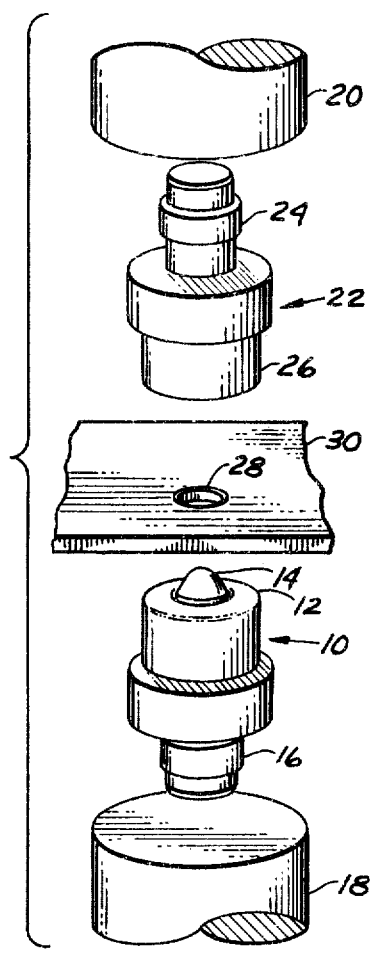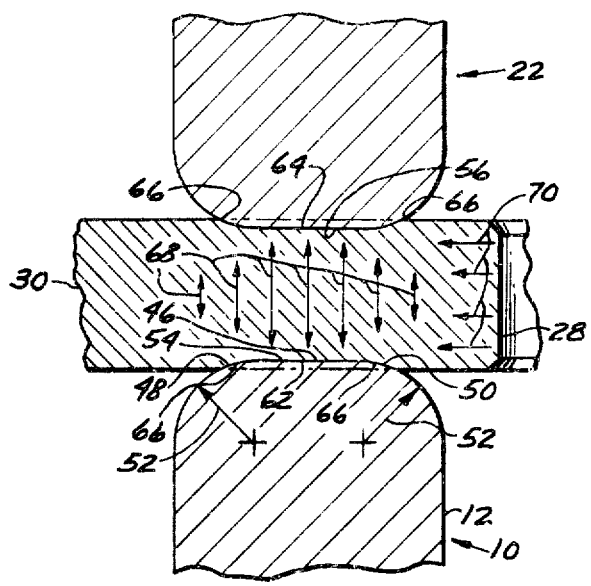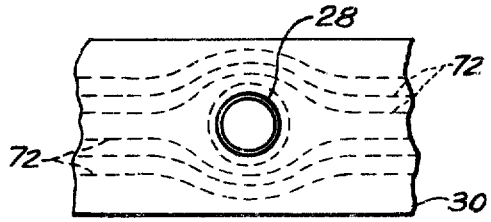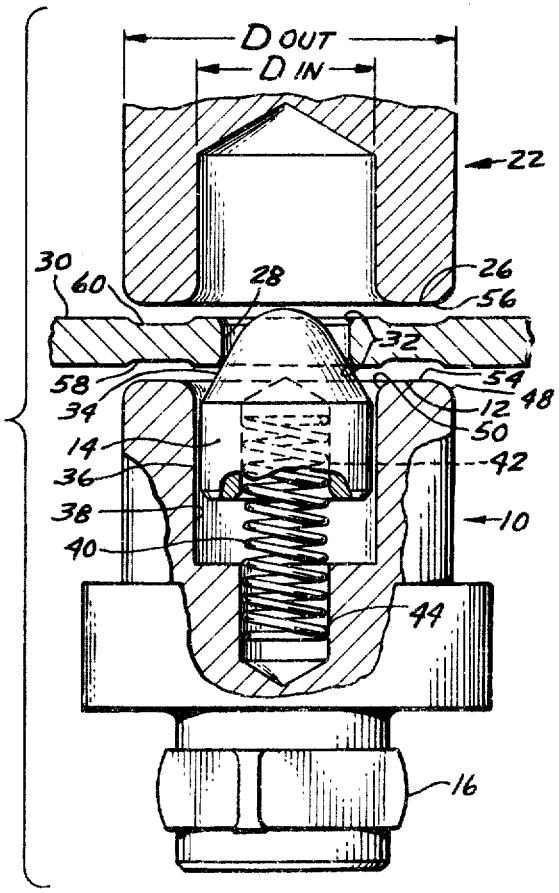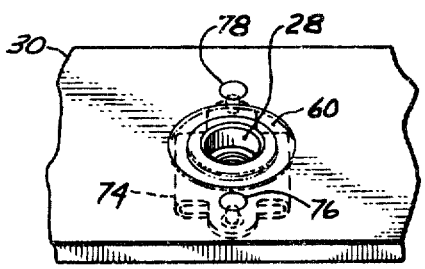

RING PAD STRESS COINED STRUCTURE

CROSS REFERENCE TO RELATED PATENTS

This is a division of application Ser. No. 277,359, filed Aug. 2, 1972, now U.S. Pat. No. 3796086.

This application relates to the subject matter of U.S. Pat. No. 3,110,086 entitled "Coining Structural Parts" by Austin Phillips and U.S. Pat. No. 3,434,327 entitled "Stress Coining" by Eugene R. Speakman. Reference is made to the information therein as though fully set forth hereinbelow.

BACKGROUND OF THE INVENTION

In structural parts incorporating lightning holes, bolt holes, fuel transfer holes and other apertures, edge notches and other interruptions in the continuity of the parts, it is well recognized that the mere calculation of the strengths for such parts under static load is insufficient to enable design of such parts when they are expected to be subjected to fluctuating loads. This is because such parts tend to fail in fatigue even though the stress approaching the ultimate breaking load is normally never experienced in actual service. Ring groove and pad coining methods for improving the fatigue strength of parts having apertures therethrough are shown in the referenced patents. Both of the patents disclose means which establish a field of residual compressive stress about the aperture, which stress tends to measurably increase the fatigue life of the part. Unfortunately, both methods have disadvantages that preclude their universal use. For example, the ring groove coining method, as disclosed in U.S. Pat. No. 3,110,086, when used on materials below 0.065 inch thickness, tends to generate an internal shear crack in the grooved area which is unacceptable. Also, precise control of the depth of the groove is important in the ring groove method since a shallow groove results in less than optimum fatigue improvement and a deep groove can result in a doughnut-shaped punch out. In the production situation, the desired way to control the depth of the groove is by controlling the force applied to the grooving die. However, because of the shape of the dies, the groove depth can vary greatly with the same applied force. In the pad coining method disclosed in U.S. Pat. No. 3,434,327, the pilots from each die contact each other preventing coining of material in thicknesses below 0.090 inch. At the same time a substantial amount of material adjacent the aperture is plastically deformed so the aperture closes up, sometimes seizing the die pilots in the aperture. As a result, the pilots must be made undersize to compensate for aperture closure. It is therefore difficult to assure that the pad coining is concentric with the aperture. Also both prior art coining methods require extremely high force levels, especially when the material being coined is steel or titanium. The high force levels effectively eliminate the use of portable tools, which means that retrofit or repair of a part requires its removal to a shop area.

In modern aircraft which are of fail-safe design, it is conventional practice to use thin sacrificial doublers for the attachment of leading edges or access doors to the structural spar cap flanges which support them. The sacrificial doublers are attached at one edge to the spar cap flanges with interference attachments to assure an adequate fatigue life for the spar cap flanges. The opposite edges of the doublers include clearance holes and adjacent floating nut plates to enable easy attachment of the leading edge or access doors to the doublers. Since the doublers are attached to the spar cap with interference attachments, the same stress levels present in the spar cap flanges are also present in the doublers. The uncoined clearance holes in such doublers have a very low fatigue life and cracks result in a relatively short service time. Although a crack in a doubler is of secondary importance because it cannot cause a disasterous primary failure, the cracks are bothersome and expensive since their existence requires regular replacement of the doublers based on relatively few flight hours for the aircraft. Therefore, means for increasing the fatigue life of such doublers which tend to be relatively thin have been required.

SUMMARY OF THE INVENTION

The present ring pad stress coining method was developed to fill the gaps in the prior art fatigue strength improvement methods with aluminum, steel and titanium from 1/2 inch thick down to foil gauges being of primary interest. The method is comprised of plastically compressing a substantially flat bottomed ring of material in one or both side surfaces of a part generally concentric with an aperture or discontinuity in the part. The tooling to perform the ring pad coining has a die surface which includes a flat portion with adjacent curved edge portions. This shape provides a relatively wide, flat band contact area between the coining die and the part which enables relatively precise depth control by control of the force applied thereto. The total depth required to generate the desired volume of residual compression stress and to provide the desired fatigue strength is reduced by such shape so that usually the total coining force can be generated by means of portable tools. The tooling can also include a resilient pilot which assures the coined ring pad is maintained concentric with the aperture it surrounds. The pilot retracts as the die is brought into engagement with the workpiece so the pilot never is locked in the aperture by the plastic deformation of the material around the aperture.

It is therefore the object of the present invention to provide a relatively thin structural part with an improved fatigue strength even though apertures are present in the part.

Another object of the present invention is to provide a metal part of good fatigue strength which is economically and quickly fabricatable.

Another object of the present invention is to provide a part whose fatigue life increasing feature is simple to quality inspect.

These and other objects and advantages of the present invention will become apparent after considering the following detailed specification which covers preferred embodiments thereof in conjunction with the accompanying drawings.

BRIEF DESCRIPTION OF THE DRAWINGS

FIG. 1 is an exploded pictorial view showing apparatus to provide ring pad stress coining;

FIG. 2 is a partial cross-sectional view of ring pad stress coining tooling after ring pad coining a workpiece;

FIG. 3 is an enlarged cross-sectional view showing the shaping details of a typical ring pad stress coining die in engagement with a workpiece;

FIG. 4 is a view depicting a stress pattern of an apertured and ring pad coined structural member showing lines of stress therein; and FIG. 5 is a perspective view of the workpiece of FIG. 2 after a ring pad coining operation, the workpiece being shown with a floating nut plate riveted thereto.

DESCRIPTION OF THE SHOWN EMBODIMENTS

Referring to the drawing more particularly by reference numbers, number 10 in FIG. 1 refers to a ring pad coining tool for performing ring pad coining according to the present invention. The tool 10 includes a ring pad coining die 12 having a resilient pilot 14 mounted centrally therein. Attachment means 16 are provided on the opposite end of the tool 10 from the die 12 to provide means for attaching the tool 10 to suitable force applying means which are shown symbolically in FIG. 1 by cylinders 18 and 20. The force applying means may be any of a widely known group of tools including a rivet gun in which case the cylinder 20 represents a bucking member, and a C-clamp type squeezer in which case a second coining tool 22 may be connected by its attachment means 24 to the cylinder 20. If used, the tool 22 has a coining die 26 similar to die 12 but lacks a pilot member since C-clamp type squeezers act to maintain the dies 12 and 26 in axial and perpendicular alignment. The pilot 14 of the tool 10 is used to assure the proper concentric alignment of the dies 12 and 26 with the aperture 28 in the workpiece 30 in which the coining is to take place. FIG. 2 shows this axial and perpendicular alignment more clearly.

Before coining, the aperture 28 is usually prepared by having its edges broken about .010 ± 0.005 inch at 45° ±5°. This results in frustroconical surfaces 32, one of which engages the pilot 14 as the tool 10 is brought against the workpiece 30. If multiple layers of material are being coined simultaneously, the frustroconical surfaces 32 need only be formed at the outer surfaces of the apertures through the stackup. The pilot 14 includes a rounded frustroconical end portion 34 which acts as the guiding surface and a cylindrical portion 36 which rides on an inner circumferential surface 38 of the die 12. The pilot 14 as aforesaid is resiliently mounted to the die 12 and such mounting means are shown as a spring 40 which extends into apertures 42 and 44 in the pilot 14 and the die 12 respectively. The diameter of the spring 40 is chosen so that it frictionally and resiliently engages the surfaces of the apertures 42 and 44, thereby retaining the pilot 14 to the tool 10. Once the pilot 14 has engaged the break 32 of the aperture 28, it retracts as the die 12 is forced into engagement with the workpiece 30, thereby assuring that the die 12 is concentric with the aperture 28.

As shown in FIG. 3, the die 12, which is doughnut-shaped, has a coining surface 46 comprised of first and second radius portions 48 and 50 of a predetermined radius 52 with a flat portion 54 therebetween. The relative dimensions of the radius 52 and the flat portion 54 are shown in Table I for tools for coining holes of the indicated size. The optional die 26 has a similar die surface 56.

TABLE I

| Hole diameter to coin | D out | D in | $F_{54}$ | $R_{52}$ |
|---|---|---|---|---|
| .180–.229 | .462 | .2750 | .033 | .030 |

TABLE I-Continued

| Hole diameter to coin | D out | D in | $F_{54}$ | $R_{52}$ |
|---|---|---|---|---|
| .230–.291 | .523 | .3370 | .033 | .030 |
| .292–.354 | .586 | .4000 | .033 | .030 |
| .355–.416 | .648 | .4620 | .033 | .030 |

When the dies 12 and 26 are constructed, great care is used to assure that the surfaces 46 and 56 thereof are given a mirror finish since any irregularity in the die surface results in a degradation of optimal levels of fatigue strength improvement. It is then usual to further assure that the surfaces 46 and 56 are smooth by chrome plating them. When in use, the die surfaces 46 and 56 are also protected by applying heavy cutting oil metal-working lubricant such as Pems 300 manufactured by Pemco Inc., Los Angeles, California, so the die surfaces 46 and 56 are not galled or otherwise damaged when they are forced into the workpiece during the coining operation. The lubricant also reduces the friction between the dies 12 and 26 and the workpiece 30 so the temperature of the workpiece 30 is not raised substantially. Excessive heating is undesirable because it causes reduction of the residual compressive stress which must remain in the workpiece 30 to imporve its fatigue strength. The lubricant also assures a more consistent result when the force applied to the dies 12 and 26 is the regulated force to control the depth of penetration of the dies to form the depressed ring pad.

The groove or grooves generated by the tool 10 and when employed, the tool 22, follow the shape of the coining dies 12 and 26 so a concentric ring 58 or rings 58 and 60 having flat bottoms 62 and 64 with curved edge portions 66 result when the tools 10 and 22 are forced into the workpiece 30. This is because the dies 12 and 26 are driven with sufficient force to plastically deform the workpiece 30. As a rule of thumb, the amount of plastic deformation should equal the elastic deformation so the average workpiece rebound is one-half the total elastic and plastic deformation. The described shape of ring pad grooves has proved to be advantageous especially in this gauges of material since it produces the desired residual compressive stress which is shown diagrammatically by the vector arrows 68 and 70 in FIG. 3. As can be seen, the present method results in two general types of induced compressive stress. The stress represented by arrows 68 is internal surface to surface compressive stress akin to the stress generated by the prior art pad coining method while the stress represented by arrows 70 is radial and circumferencial stress akin to the stress generated by the prior art ring groove coining method. It is the combined residual compressive stresses created by the present stress coining method which provides greatly improved fatigue strength for thin workpieces 30 having apertures 28 therethrough.

A possible explanation of the fatigue strength improvement is shown in FIG. 4 which is a stress diagram of the workpiece 30 having an aperture 28 about which the ring pad coining operation has been performed. Stress lines 72 depict the stress pattern of the workpiece 30 showing the effect of the ring pad stress coining operation. It should be noted that the lines of stress 72 do not converge on the aperture but seem to be fenced out instead tending to flow around the aperture similar to an aerodynamic flow pattern. In open noncoined holes, the lines of stress tend to converge toward the center of the aperture 28 to concentrate thereat which substantially reduces the fatigue strength of the workpiece.

Table II shows test results of fatigue tests taken of 5 specimen structures of the indicated material and thicknesses having a quarter inch open hole. The maximum net area tension stresses were 35,000 psi and all tests had an R factor equal to +0.2, that is, the stresses were cycled from 20% to the indicated load.

TABLE II

| MATERIAL & THICKNESS | RING PAD DEPTH REQ'D | ACTUAL | COINING LOAD (LBS) | CYCLES TO FAILURE |
|---|---|---|---|---|
| .090 | .0005 | .0005 | 7,000 | 35,000 / 39,000 |
| 7075–T6 | .0015 | .0014 / .0015 | 10,500 | *1,200,000 / 5,157,000 |
|  | .003 | .003 | 13,000 | *2,550,000 / *2,630,000 |
| .190 | .001 | .0009 / .0011 | 11,500 | 197,000 / 238,000 |
| 7075–T6 | .003 | .003 | 15,000 | *1,120,000 / 874,000 |
|  | .005 | .005 | 17,500 | 564,000 / 750,000 |
|  | .001 | .001 | 13,000 | 94,000 / 127,000 |
| .250 | .003 | .0035 | 17,000 | 1,830,000 / 1,060,000 |
| 7075–T6 | .005 | .005 | 18,500 | *1,670,000 / *2,521,000 |
|  | .007 | .0054 / .0081 | 19,500 | 795,000 / *2,615,000 |
|  | .003 | .003 / .004 | 18,000 | 61,000 / 86,000 |
| .375 | .005 | .005 / .006 | 20,000 | 290,000 / 954,000 |
| 7075–T6 | .007 | .007 / .008 | 21,500 | 547,000 / 355,000 |
|  | .009 | .009 / .010 | 22,500 | 979,000 / 318,000 |
| .090 | .0005 | .0005 | 5,500 | 116,000 / 75,000 |
| 2024–T3 | .0015 | .0015 / .0017 | 8,000 | 621,000 / 991,000 |
|  | .003 | .0028 / .0033 | 11,000 | 1,491,000 / 1,489,000 |
| .190 | .001 | .0008 / .0013 | 8,500 | 134,000 / 182,000 |
| 2024–T3 | .003 | .0033 / .004 | 12,000 | 1,189,000 / 490,000 |
|  | .005 | .0055 / .006 | 13,500 | 898,000 / 607,000 |
|  | .001 | .001 | 9,500 | 187,000 / 162,000 |
| .250 | .003 | .003 / .0035 | 13,000 | *2,000,000 / 3,471,000 |
| 2024–T3 | .005 | .0045 / .0053 | 15,000 | *2,554,000 / 1,089,000 |

TABLE II-Continued

| MATERIAL & THICKNESS | RING PAD DEPTH REQ'D | ACTUAL | COINING LOAD (LBS) | CYCLES TO FAILURE |
|---|---|---|---|---|
|  | .007 | .0068 / .0075 | 16,500 | *3,580,000 / 2,595,000 |
|  | .003 | .0029 / .0033 | 13,500 | 78,000 / 104,000 |
| .375 | .005 | .0050 / .0055 | 15,500 | 131,000 / 143,000 |
| 2024–T3 | .007 | .0068 / .0073 | 16,400 | 335,000 / 330,000 |
|  | .009 | .0095 / .010 | 17,750 | 963,000 / 667,000 |

*No Failure

As can be seen from Table II, the actual depth of the coined ring pad varied little with a given coining force. This proved coining force is an acceptable way to control the present method. The novel shape of the coining dies 12 and 26 makes control by force control practical. This is because the flat portion 54 causes high force resistive levels within the workpiece 30 which tend to limit further penetration by the die 12 and the curved portions 48 increase the contact area substantially, once the die has penetrated to the desired depth, thus also tending to limit the depth of penetration of the coining die.

Since the required amount of force applied to the tool 10 to obtain the desired penetration and thereby the depth of the coined pad depends in large measure upon the material to be coined and the treatments that the material may have sustained, it is usual practice when coining a new type of production part to make a test specimen setup using the same hole size, thickness, alloy and temper as for the production part. What is thought to be the correct force is then applied to the die or dies across the specimen and the depth of the ring pad groove is measured. Final force adjustments are then made as necessary to establish the required coin depth. Once set up, the coining tool 10 can be used to coin the production parts and the coining can be quality assured very simply by merely measuring the depth and observing the smoothness and symmetry of the ring pad groove. The depth of the groove can be directly related to the amount of fatigue strength improvement while smoothness and symmetry are a measure of the care taken during the coining operation. When a rivet gun and bucking member are used to coin only one side of a workpiece, it is usual practice to use a rivet gun with an unrestricted air inlet and full air line pressure and then apply enough blows to obtain the required depth of the ring pad groove.

FIG. 5 shows a typical application of the present ring pad coining method wherein a floating nut plate 74 is attached by rivets 76 and 78 to the coined workpiece 30 behind the aperture 28. In such an application it is extremely convenient that the present method can be employed closely adjacent to the aperture 28 so that a standard floating nut plate 74 can be used and so the rivets 76 and 78 located as shown do not interfer with the groove 60 or 58.

Thus, there has been shown and described a novel method for increasing the fatigue strength of workpieces having apertures therethrough which fulfill all the objects and advantages sought before. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A structural member having a first and second surface and a discontinuity in at least the first surface, the improvement comprising:

a first depressed groove coldworked in said first surface spaced from said discontinuity, said depressed groove having a cross section which has a linear portion at the bottom thereof and a grooved portion which extends upwardly from a point of tangency with said linear portion to said first surface, said coldworked depressed groove forming a first volume of member material having residual radial and circumferential compressive stress therein due to said coldworking thereof, said first volume being adjacent said discontinuity and extending therefrom to said first groove and a second volume of member material between said first and second surfaces and under said first groove, said first and second volumes of stressed material improving the fatigue strength of said structural member by fencing out fatigue causing stress concentrations at the discontinuity.

2. The member defined in claim 1 wherein said structural member includes:

a depressed groove in said second surface similar to said depressed groove in said first surface, said depressed groove in said volume of compressive stress between said first and second surfaces being between said depressed grooves.

3. A structural member defined in claim 1 wherein said linear portion at the bottom of said groove is substantially wider than the depth of said groove.

* * * * *